United States Patent [19]
Renard

[11] 4,034,282
[45] July 5, 1977

[54] CHOPPER-STABILIZED POWER SUPPLY
[75] Inventor: Yves Renard, Paris, France
[73] Assignee: Thomson-CSF, Paris, France
[22] Filed: Oct. 20, 1975
[21] Appl. No.: 624,408
[30] Foreign Application Priority Data
  Oct. 22, 1974 France .............. 74.35446
[52] U.S. Cl. ................ 323/17; 323/DIG. 1; 363/124
[51] Int. Cl.² ........................ G05F 1/56
[58] Field of Search ........... 307/240, 246, 253; 321/2, 18; 323/17, DIG. 1

[56] References Cited
UNITED STATES PATENTS

| 3,492,503 | 1/1970 | Bose | 307/253 X |
|---|---|---|---|
| 3,590,361 | 6/1971 | Bishop et al. | 323/DIG. 1 |
| 3,631,314 | 12/1971 | Hendrikus | 307/253 X |
| 3,820,008 | 6/1974 | Guarnaschelli | 323/DIG. 1 |
| 3,839,668 | 10/1974 | Black | 323/DIG. 1 |

FOREIGN PATENTS OR APPLICATIONS

| 2,064,254 | 7/1972 | Germany | 323/DIG. 1 |

OTHER PUBLICATIONS

Hoffman et al., "Transistor Fast Turnoff Insensitive to Drive Transition," IBM TDB vol. 17, No. 4, Sept. 1974, pp. 1089-1090.

Primary Examiner—A. D. Pellinen
Attorney, Agent, or Firm—Edwin E. Greigg

[57] ABSTRACT

A chopper-stabilized power supply which comprises a switching transistor connected with an integrating filter between a source of unstabilized d.c. energy and a load circuit. A voltage comparator compares the output voltage of the supply to a reference voltage and delivers a rectangular control signal to a control transistor which controls the base current of the switching transistor. In the collector-emitter circuit of the control transistor, there is provided an inductor which is the primary winding of a transformer, the transformer also comprising a secondary winding connected in series with a diode to the base of the switching transistor for neutralizing the charge carriers present in the junction at each cut-off of the current of the control transistor.

4 Claims, 6 Drawing Figures

CHOPPER-STABILIZED POWER SUPPLY

BACKGROUND OF THE INVENTION

The present invention relates to chopper-stabilized power supplies and more particularly to chopper devices and regulating devices for stabilized supplies capable of supplying high current intensities. These supplies are adapted to furnish a high and variable direct current at constant voltage with maximum efficiency from a variable and unstabilized source of d-c energy.

The underlying principle of chopper-stabilized supplies is the following: a switch, usually a transistor, chops the current furnished by the unregulated source of energy at a rate set by a pilot circuit. The chopped current is applied to an integrating filter constituted by an induction coil in series with the transistor and a capacitor connected to the terminals of the circuit of utilization. The output voltage is compared with a reference voltage by a pilot circuit which switches the switching transistor off or on. As soon as the switch is closed, an increasing current flows in the induction coil and in the capacitor. When the switch opens, the energy stored in the induction coil is restored in the form of a current which flows in the induction coil and decreases owing to a recovery diode which closes the induction coil onto the output. The pilot circuit which controls the opening and closing of the switch acts as a voltage-duration or voltage-frequency converter. It converts the difference between the output voltage and a reference voltage into pulses of variable width or variable repetition frequency and applies them through a power amplifier to the switching transistor.

In order to ensure that the transistor performs its switching function without excessive losses, it is essential that it be saturated in respect of any intensity of the current liable to pass therethrough. When this condition is satisfied, the main energy losses are due to the transitions of transistor saturation and cut-off.

The saturation of the transistor requires the injection of a base current and poses no particular problem. Indeed, it is known to apply to the transistor a base current which increases as the collector current by inserting an induction in the base circuit. The base current for saturating the transistor is therefore low and during the closure of the transistor, the control current increases as the supplied current.

But during the cut-off stage the charge carriers which remain in the base of the transistor prevent the sudden stoppage of the collector current and a non-negligible proportion of the energy is dissipated in the transistor.

An object of the invention is to reduce the duration of the cut-off stage of the switching transistor.

SUMMARY OF THE INVENTION

According to the invention, there is provided a chopper-stabilized power supply comprising a switching transistor and an integrating filter connected between a source of unstabilized d.c. energy and a load circuit, a voltage comparator for comparing the output voltage of the power supply to a reference voltage and for delivering rectangular signals of variable width and constant repetition frequency or constant width and variable repetition frequency, a control transistor coupled to said voltage comparator for furnishing a control current to the base of said switching transistor, the emitter-collector circuit of said control transistor comprising an inductor which is constituted by the primary winding of a transformer, said transformer comprising a secondary winding connected in series with a diode to the base of the switching transistor for neutralizing the charge carriers present in the junction of said switcing transistor at each cut-off of the current of the control-transistor.

DESCRIPTION OF THE DRAWING

Further features of the invention will be apparent from the ensuing description with reference to the accompanying drawing in which:

In FIGS. 1, 2, 4 & 5 identical elements are designated by the same reference characters.

DETAILED DESCRIPTION

Figure 1:
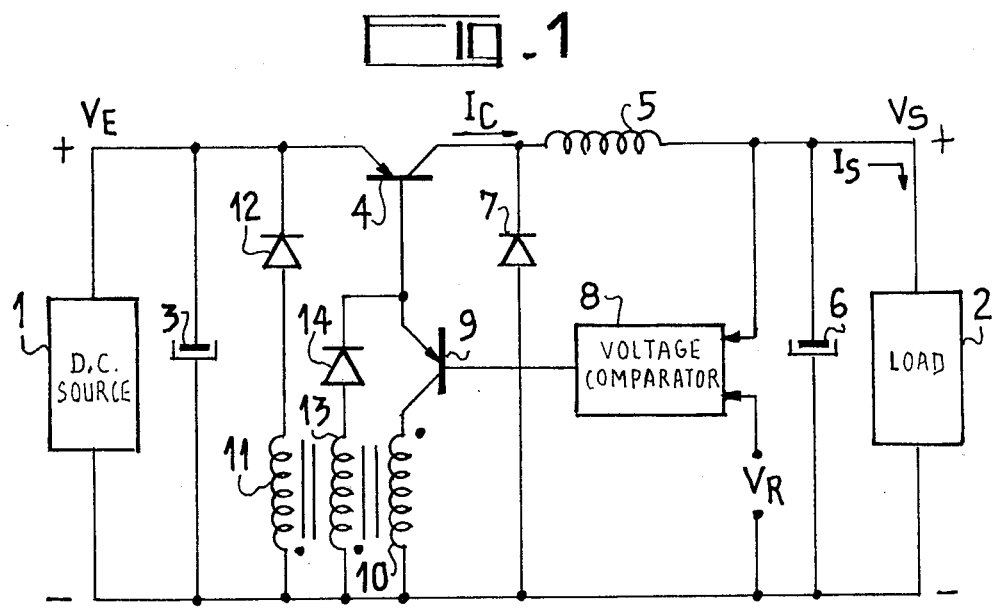
FIG. 1 is one embodiment of a chopper-stabilized power supply according to the invention.

FIG. 1 shows one embodiment of a chopper-stabilized power supply.

The chopper-stabilized power supply must supply, from a source 1 of an unstabilized d-c energy at a voltage $V_E$, to a utilization circuit or load 2 a variable mean current at constant voltage VS having a minimum of residual undulation and an internal resistance which is as low as possible.

The supply comprises an input capacitor 3 connected to the terminals of the source of energy 1. A switching transistor 4 is connected in series with an inductor 5 in one of the main conductors (+) of the supply, the inductor being placed adjacent the output. The switching transistor 4 operates in an off or on manner. It is saturated and cut off by a voltage comparator 8 one input of which is connected to the output (+) of the supply whereas the other input is connected to a source of constant voltage $V_R$ which may be a suitably polarized zener diode.

The comparator delivers rectangular signals to a power transistor 9 which controls the switching transistor 4.

Upon the instant at which the switching transistor has just been switched on, an increasing current Ic is established in the inductor 5 until the moment the capacitor 6 reaches its maximum charge. At this moment the comparator 8 produces the cut-off of the transistor 4. At the same moment the voltage at the terminals of the inductor 5 is inversed and the energy stored in this inductor flows in the load and the capacitor through the recovery diode 7. The ratio $V_E/V_S$ between the input voltage and the output voltage determines the conducting time. This time, and the recurrence frequency, also depend on the current $I_S$ which flows in load 2.

The emitter-collector circuit of the control transistor 9 comprises a series inductor 10. The inductor 10 is so designed as not to be saturated by the current flowing therethrough and to have a low ohmic resistance and low iron losses at the rate of operation. When the control transistor 9 is conductive, the collector current of this transistor, and therefore the base current of the switching transistor 4, is established progressively since it is retarded by the inductor 10. The value of the inductor 10 is so chosen that at any moment of the conducting period of the switching transistor the current is at least equal to that which ensures full saturation of this transistor. The presence of the inductor 10 avoids the power losses which would result from the passage of an excessively high base current in the switching transistor throughout the conducting period.

During the saturation stage of the switching transistor, the energy for controlling the transistor is adapted to be transmitted energy.

During the off stage of the switching transistor, the energy absorbed by the inductor 10 is restored to the input source by an inductor 11 disposed in the same magnetic circuit as the inductor 10 and connected, in series with a diode 12, to the terminals of the input capacitor 3. The inductor 10 is constituted by the primary winding of a transformer and the inductor 11 by a secondary winding. The direction of connection of the secondary winding 11 and that of the diode 12 are suitably chosen to ensure that the diode is polarized in the non-passing direction by the input voltage $V_E$ and in the passing direction by the voltage which is induced at the terminals of the secondary winding 11 owing to the discharge of the transformer when the transistor 9 passes to the off state. The black dots at one end of the windings indicate the relative directions of connection of these windings. This recovery of energy substantially increases the efficiency of the supply.

The efficiency is still further improved in reducing the fall time of the current in the switching transistor at the moment of the cut-off of the latter.

This improvement is obtained by adding a secondary winding 13 connected in series with a diode 14 between the main conductor (−) of the supply and the base of the switching transistor. The action of this winding reduces the discharge time of the charge carriers stored in the base-emitter junction of the transistor.

During the saturation stage of the switching transistor the secondary windings 11 and 13 supply no current. At the moment of the cut-off of the collector current of the control transistor 9, the energy stored in the magnetic circuit of the transformer is restored, on one hand, through the winding 11 and the diode 12 in the input capacitor 3 and, on the other, through the winding 13 and the diode 14 in the base of the switching transistor 4. The charge carriers stored in the junction of the control transistor 9 are also discharged in the base of the switching transistor 4. All this energy is discharged in the form of a very brief pulse which neutralizes the charge carriers present in the junction.

Figure 2:
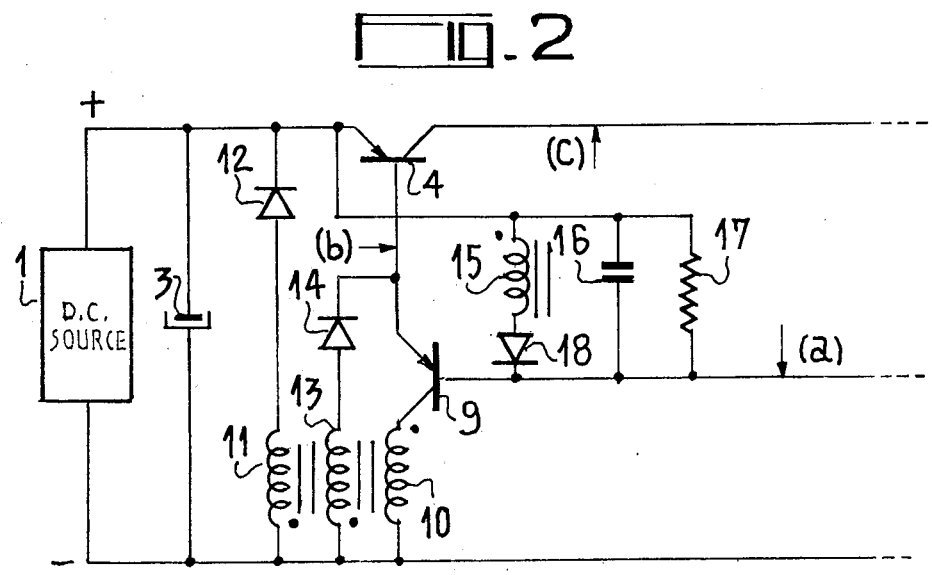
FIG. 2 is an improvement of the preceding circuit.

In FIG. 2 the same circuit is shown in part, with the input source 1, the capacitor 3, the transistors 4 and 9, the windings 10, 13, 11, and the diodes 12 and 14. An additional secondary winding 15 is added to the transformer and connected in series with a diode 18 between the base of the control transistor 9 and the main conductor (+) of the supply source. A capacitor 16 and a resistor 17 are connected in parallel with the terminals of the circuit consisting of the winding 15 and diode 18.

The winding 15 acts in the same way as the winding 13 but on the control transistor. At the moment of the cut-off of the control transistor 9, a part of the energy stored in the transformer is restored in the form of a very brief pulse which rapidly turns the transistor 9 off.

The presence of the cut-off winding 15 for the control transistor still further substantially decreases the fall time of the collector current of the switching transistor 4. The elements 16 and 17 are provided for damping the action of the winding 15 and permitting the operation of the supply within a wider range of chopper frequencies.

Figure 3:
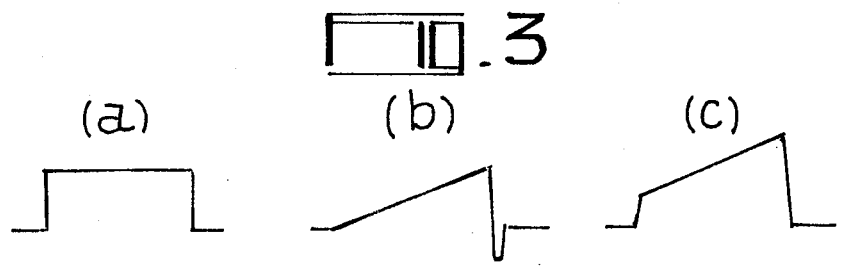
FIG. 3 is the form of the signals at various points of the circuit.

FIG. 3 shows the form of the currents, at (a) at the output of the comparator 8, at (b) at the base of the switching transistor 4, and at (c) in the emitter-collector circuit of this transistor.

The control signal delivered by the comparator 8 is a rectangular signal (a). The primary winding 10 of the transformer carriers an increasing current (b) of triangular form. At the moment of the cut-off of the transistor, a current pulse of opposite direction to the base current eliminates the charge carriers. The collector current (c) of the switching transistor has also a trapezoidal form with a steep trailing edge.

Figure 4:
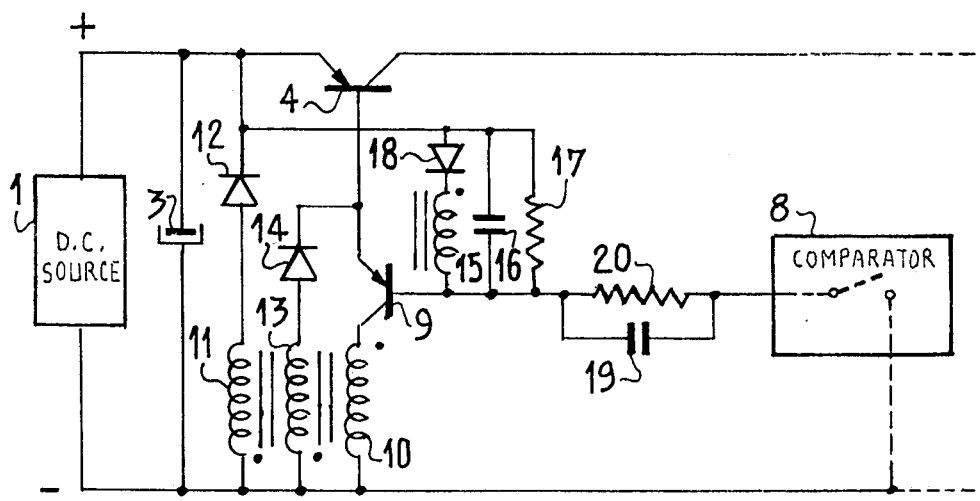
FIG. 4 is another improvement of the supply.

FIG. 4 shows an improvement of the circuit shown in FIG. 2 all of the elements of which are shown again. In this modification, in order to diminish the total time for the establishment of the collector current of the switching transistor 4, a capacitor 19 is inserted in the base circuit of the control transistor 9. This capacitor is connected in parallel to the terminals of the resistor 20 which is adapted to limit the base current of the control transistor. The comparator circuit 8 has been simplified for the understanding of the diagram and represented in the form of a switch connected between the base circuit of the transistor 9 and the main conductor (−) of the supply.

When the control transistor is on, the capacitor 19, which was previously discharged, is charged through the base-emitter circuit of the two transistors 4 and 9. This action reduces the response time and the time of increase of the base current of the transistors by permitting the passage of a spike of current which accelerates the turning on of the transistors.

This action contributes with the action of the cut-off windings, 13 and 15, to increase the efficiency of the supply.

Figure 5:
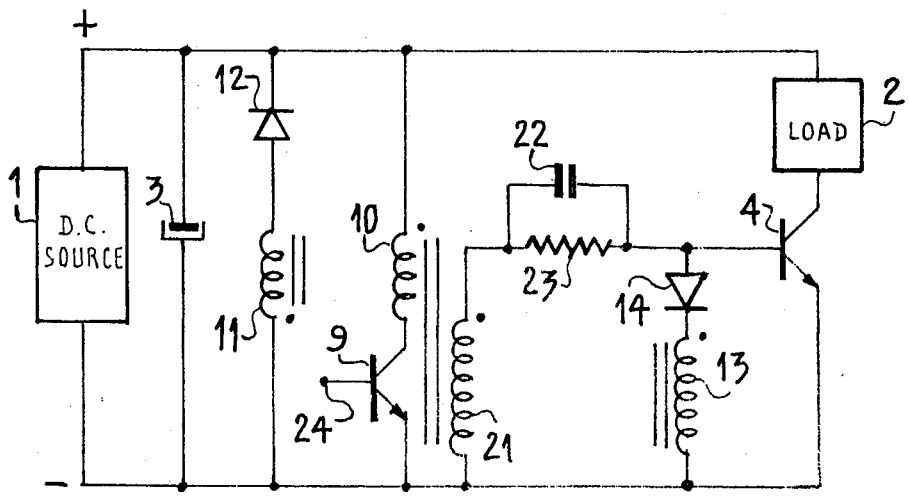
FIG. 5 is another embodiment of a chopper-stabilized supply.

FIG. 5 shows a modification of the preceding circuit. The illustrated supply is intended to furnish to a load 2 a current chopped by a switching transistor 4. This type of circuit, which is slightly different from conventional chopper-stabilized supply circuits, has been shown by way of example to illustrate the various means employed for increasing the efficiency of the switching transistors.

This source of energy 1 is applied therefore to the load 2 through a switching transistor 4. A control transistor 9 receives at its base a pulse control signal from a terminal 24. The collector-emitter circuit of the transistor 9 is connected in series with the primary winding 10 of a transformer to the terminals of the source of energy 1. The pulse control signals are transmitted to a secondary winding 21 connected to the base of the switching transistor.

The various means for improving the efficiency of the supply comprise: a secondary winding 11 in series with a diode 12 and connected to the terminals of an input capacitor, recovers the magnetic energy at the end of each pulse in the form of a current which recharges the capacitor 3. The secondary winding 13, in series with a diode 14 (a diode with a low threshold, preferably a Schottky diode), connected between the base of transistor 4 and the conductor (−) produce a very brief negative pulse upon each cut-off which eliminates the electric charges accumulated in the base of this transistor. Lastly, a capacitor 22 and a resistor 23 in parallel are connected between the secondary winding 21 and the base of the transistor 4 to reduce the off and on times of the latter.

Figure 6:
FIG. 6 is the form of the signals at various points of the preceding supply.

The form of the signals is shown in FIG. 6. At (a) there is shown the pulse signal applied to the terminal 24. At (b) the signal transmitted to the base of the transistor 4 has a positive peak at the start of the pulse due to the capacitor 22 and a negative peak at the end of the pulse due to the cut-off winding 13 and also to the capacitor 22. The chopped signal (c) which flows through the load then has steep leading and trailing edges.

The supply according to the invention retains all the advantages of conventional systems without their drawbacks. The reduction in the storage time of the charges in the switching transistor to one third of its initial value (the case of FIG. 4), permits increasing the dynamic of the input voltage by more than 50%. The decrease in the duration of the fall edge of the current transmitted by the switching transistor, in a ratio of 1:5, permits increasing the overall efficiency of the supply in the order of 10 to 15%.

The invention is applicable to stabilized supply regulating devices irrespective of the number of switching transistors employed.

It is applicable more generally to electronic power equipment requiring the supply of a high current with the best efficiency, it being possible to furnish this current in a continuous or rectangular form.

What is claimed is:

1. A chopper-stabilized power supply comprising a switching transistor and an integrating filter connected between a source of unstabilized d.c. energy and a load circuit, a voltage comparator for comparing the output voltage of the power supply to a reference voltage and for delivering rectangular signals of variable width and constant repetition frequency or constant width and variable repetition frequency, a control transistor connected by its base to said voltage comparator for furnishing a control current to the base of said switching transistor, the emitter-collector circuit of said control transistor being connected in series with an inductor which is connected to one terminal of said source and which is constituted by the primary winding of a transformer, said transformer including a secondary winding connected to said one terminal and in series with a diode to the base of said switching transistor for neutralizing the charge carriers present in the junction of said switching transistor at each cut-off of the current of the control transistor and said transformer further including an additional secondary winding connected to said one terminal and in series with a further diode to the base of said control transistor.

2. A stabilized power supply, as claimed in claim 1, wherein said transformer comprises an additional secondary winding connected in series with a diode between the output terminals of the source of unstabilized d.c. energy.

3. A stabilized power supply, as claimed in claim 1, wherein a capacitor and a resistor are connected in parallel to the terminals of the second additional secondary winding and the diode connected in series with it.

4. A stabilized power supply, as claimed in claim 1, wherein a capacitor is inserted between the output of the comparator and the base of the control transistor.

* * * * *